United States Patent Office 3,464,343
Patented Sept. 2, 1969

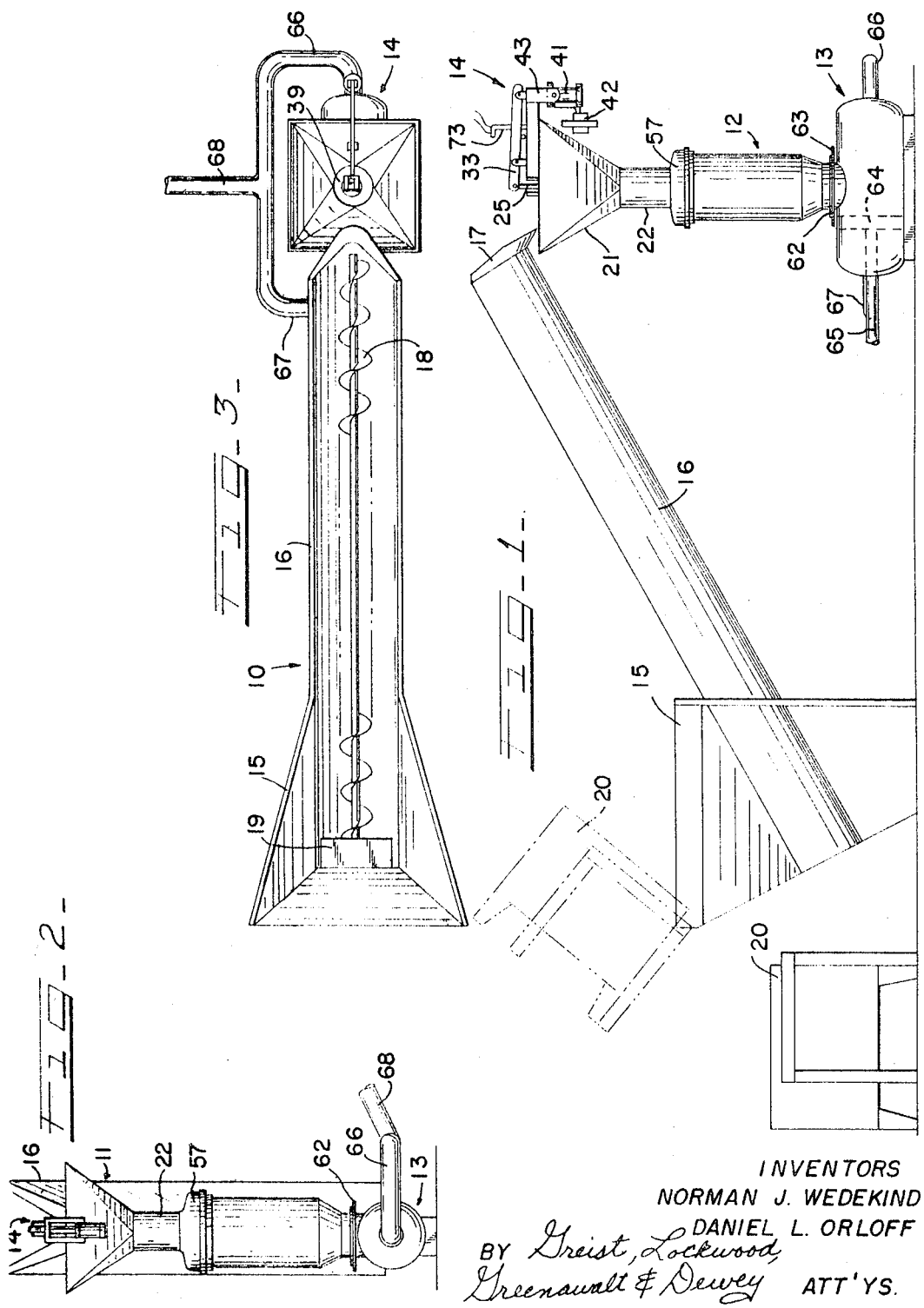

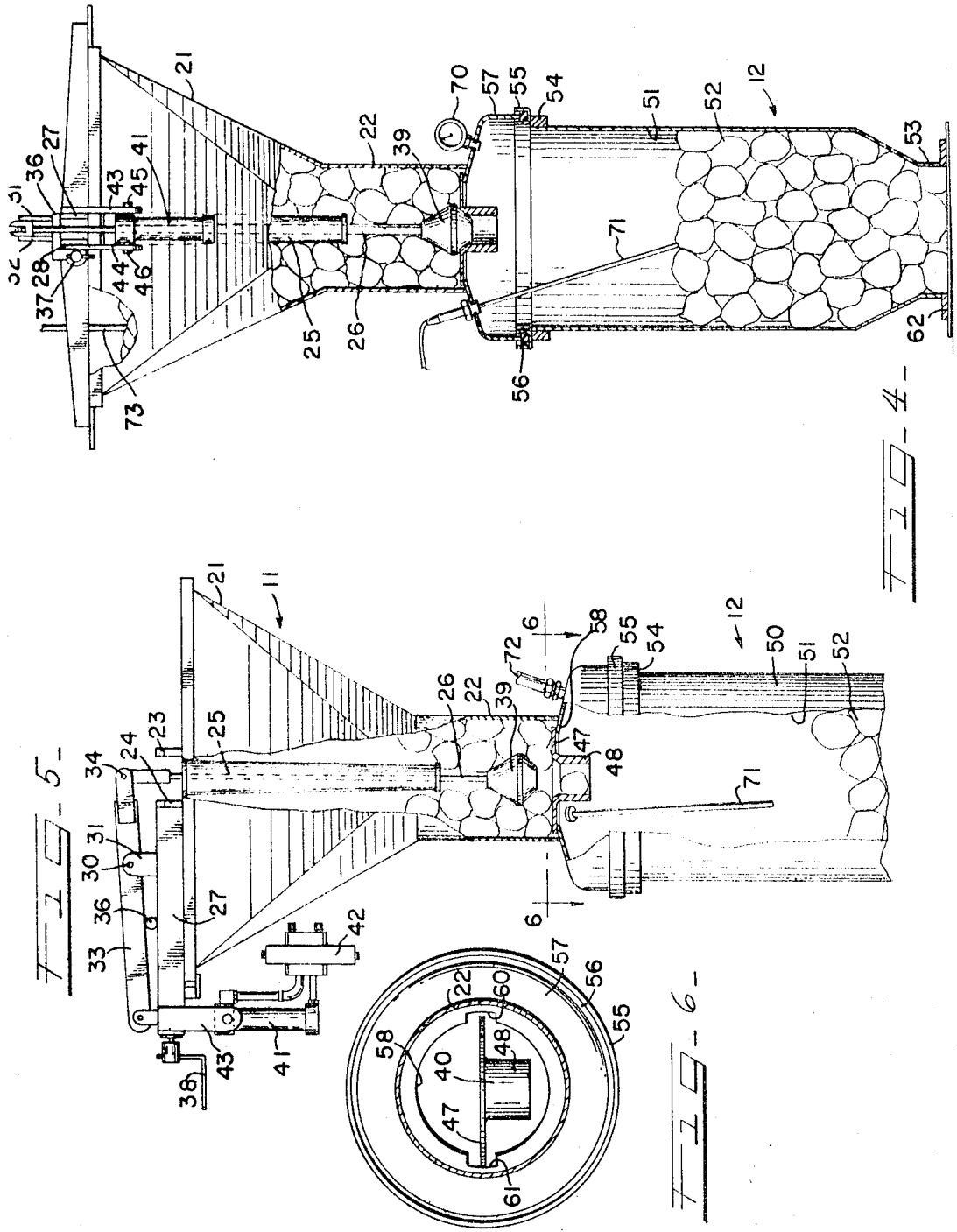

3,464,343
CONTINUOUS DEAERATOR
Norman J. Wedekind and Daniel L. Orloff, Madison,
Wis., assignors to Oscar Mayer & Co., Inc., Chicago,
Ill., a corporation of Illinois
Filed June 2, 1967, Ser. No. 643,199
Int. Cl. B65b 31/00
U.S. Cl. 99—272                                     11 Claims

ABSTRACT OF THE DISCLOSURE

A deaerator which permits continuous feeding of the product to be deaerated and, after deaeration, continuously feeds the product to a transfer pump or the like. A special valving arrangement permits continuous feeding from a supply hopper to the deaerating chamber without loss of vacuum in the deaerating chamber. Continuous feed to the supply hopper may be provided by a conveyor which is controlled by timing and the level of the product in the hopper. The shape of the hopper cooperates with the valve to assure a sufficient level of product at all times to prevent loss of vacuum during valve opening to admit product to the deaerating chamber, the valve opening occurring at timed intervals and automatically closing when the product reaches a predetermined level.

---

This invention relates to the field of food processing equipment in general and, more specifically, is directed to a deaerating system for use in continuously deaerating meat products or the like.

In food processing and particularly in the packaging of meat products, it is desirable to evacuate the product to eliminate oxygen and also assure proper filling where the product is to be packaged by volume to obtain true weight measure. Food products, and especially meat products, are prone to deterioration, discoloration or spoiling when in the presence of oxygen for prolonged periods. Under such circumstances, it is very important that the oxygen be eliminated as completely as possible from the food product. When packaging the product on a volume basis, it is equally important that evacuation be complete to eliminate any voids which would adversely affect the volume measurement and, hence, the weight of the product when packaged by volume.

The present invention relates to a continuous deaerating system which assures constant deaeration and a continuous supply of the deaerated product to a suitable pump which can feed the deaerated product to a stuffer, meat form or the like. In the present invention, a deaerating chamber communicates at its lower end with the pumping means while the upper end is closed off by a cover having a valve arrangement providing for controlled access to the chamber during deaeration. Above the deaerator is positioned a supply hopper which is uniquely shaped at its lower end to form a sleeve which cooperates with the valve to maintain a sufficient head of product so that opening and closing of the valve to admit product for deaeration will not permit any appreciable loss of vacuum. Suitable means is provided to open and close the valve, with additional means provided to maintain the supply hopper adequately filled to assure a proper level of product. These means are provided to maintain the quantity of product within the deaerating chamber and in the hopper at a suitable level. As the product is admitted to the deaerating chamber, voids or pockets which contain entrapped air explode, and the air is drawn off. Under the influence of gravity, the deaerated product falls into a transfer pump which forces it through suitable piping to a stuffer, meat form or the like. The simple construction of the present deaerator permits it to be easily disassembled by relatively unskilled persons for the requisite frequent cleaning.

Other advantages of the present system will become apparent upon consideration of the objects of the invention and a detailed description of the preferred embodiments.

It is an object of this invention to provide a new and improved continuous deaerator.

It is a further object of this invention to provide a new and improved continuous deaerator which is particularly adapted for use in deaeration of food products and the like.

It is a still further object of this invention to provide a deaerator which is of simplified construction to permit economical manufacture, as well as expedient and easy disassembly for cleaning and the like.

It is a further object of this invention to provide a continuous deaerator for use in deaerating meat products, especially chunks of meat having air entrapped therein, so as to eliminate voids, prevent discoloration, and permit accurate packaging on a volume basis, and in product packaging where the density per volume unit is uniform to provide accurate weight measurement through volumetric metering.

Objects other than those specifically set forth will become apparent upon consideration of the following description made with reference to the accompanying drawings wherein:

FIGURE 1 is a schematic side elevational view of the continuous deaerating system of the present invention;

FIGURE 2 is an end elevational view of the continuous deaerating system shown in FIGURE 1;

FIGURE 3 is a top plan view of the continuous deaerator shown in FIGURES 1 and 2;

FIGURE 4 is an enlarged cross-sectional view of the supply hopper and deaerating chamber;

FIGURE 5 is an enlarged fragmentary cross-sectional view similar to FIGURE 4, with the valve in the open position; and FIGURE 6 is an enlarged cross-sectional view taken generally along the line 6—6 of FIGURE 5, with the valve seat tilted 90° to the position for removal of the valve seat for cleaning.

The continuous deaerator shown in FIGURES 1–3 includes basic elements consisting of an elevating conveyor system 10, upper supply hopper 11, deaerating chamber 12 and transfer pump 13. In brief, the cycle of operation consists of elevating the product to be deaerated by means of the conveyor 10 to a location within the upper supply hopper 11. At selected timed intervals, the valve and valve operating means, indicated generally at 14, opens to admit the product into the deaerating chamber 12 where it is completely evacuated. As the chamber 12 is in continuous communication with the transfer pump 13, the deaerated product is then pumped to a multi-channel stuffer, volumetric metering stuffer, meat form or the like. By selected timed intervals, it is meant that the valve will open at predetermined intervals after the level of product is below that selected by an upper limit probe.

As seen in FIGURE 3, the conveyor 10 includes a lower supply hopper 15 formed at the lower end of a conveyor housing 16, having a discharge end 17 disposed immediately above the upper supply hopper 11. Disposed within the housing 16 is a worm-type conveyor 18, having a suitable drive motor indicated at 19. As apparent in FIGURE 1, the product is brought to the lower supply hopper 15 in containers 20 which may be elevated by fork-lift trucks or the like to the position shown in phantom for dumping into the supply hopper. The drive means 19 rotates the worm 18, causing the product to be elevated in the conveyor housing 16 for discharge into the upper hopper 11. As will become apparent, the elevating conveyor 10 operates at selected intervals with operation terminated by a level probe which senses the level of the product in the upper supply hopper 11, and responds by de-energizing the drive motor 19.

Referring now to FIGURES 4 and 5, it can be seen that the upper hopper 11 consists of an outwardly flared section 21 which is joined to a cylindrical sleeve section 22, providing an overall funnel-shaped appearance. At the upper part of the flared section there are provided spaced cross braces 23 and 24, mounting a guide sleeve 25 which projects into the supply hopper and slidably receives a valve stem 26. Additional braces 27 and 28 are disposed at right angles to the braces 23 and 24 and mount a fixed pivot 30, extending between spaced brackets 31 and 32. The fixed pivot 30 mounts a lever arm 33 which is connected by means of a pin 34 to the valve stem 26, forming a part of the valve operating means 14. The movement of the lever 33 about the pivot 30 is controlled by a movable stop 36, joined to an axially fixed but rotatable threaded shaft 37. A handle 38 facilitates rotation of the shaft 37, permitting the stop 36 to be adjusted axially along the top of the brackets 27 and 28 where it will be engaged by the lever 33 and thus control the stroke or total movement of the valve stem 26.

At the lower end of the valve stem 26 is provided a movable ball valve 39 which, as seen in FIGURE 4, seats against a fixed valve seat 40 to cut off flow from the hopper 11 into the deaerator 12. The valve is opened and closed by means of a fluid operated cylinder 41 controlled by a known type of solenoid operated valve 42. The cylinder 41 is suspended for pivoting movement by means of brackets 43 and 44 and trunnions 45 and 46 carried at the upper end of the cylinder.

When the cylinder is actuated, the lever 33 is pulled downwardly, moving the valve stem 26 upwardly and elevating the movable ball 39 to open the valve. As will be described in conjunction with the operation of the system, the valve is operated at timed intervals to permit the deaerating chamber to have an adequate supply for meeting the demands of the transfer pump 13. The fixed valve seat 40 is shaped like a hat having an open top, including an annular disc-like portion 47 joined to a cylindrical portion 48, the latter assuring a free fall of the product into the chamber without its clinging to the underside of the cover 57. The fixed valve seat 40 is positioned on the deaerator cover 57 at the juncture of the upper supply hopper with the deaerator 12.

The deaerator 12 includes a cylindrical body 50, forming a chamber 51 which receives a product shown at 52. The lower end of the body may be of frusto-conical shape to guide the product into a throat or opening 53 which is in continuous communication with the transfer pump 13. The pump 13 and its operation may be of any desired type and, in the present case, is of the type described in application Ser. No. 533,359, filed Mar. 10, 1966, assigned to the assignee of the present application, now Patent 3,422,489.

The upper end of the cylindrical housing 50 is provided with a reinforcing rim 54 which supports a channel-shaped member 55, having a gasket 56 disposed therein. A suitable cover 57 is positioned within the channel 55 in engagement with the gasket 56 and has the upper end formed with an annular opening 58. As seen in the cross-sectional view of FIGURE 6, the opening 58 is provided with diametrically opposed slots 60 and 61 which permit the hat ring 40 to be tilted to facilitate removal downwardly through the cover 57. In this manner, the hopper 11 may be welded or otherwise joined directly to the cover 57, and removal of the valve from the underside effected by merely separating the body 50 of the deaerator 12 from the cover 57 and tilting the hat ring 40 in the manner shown in FIGURE 6.

As seen in FIGURES 1, 2 and 4, the deaerator is provided with an annular flange 62 surrounding the throat 53 which is adapted for clamping to a flange 63 on the transfer pump 13. A stainless steel ring surrounds an O ring or equivalent gasket (not shown) and both may be interposed between the flanges with suitable means, such as toggle clamps, bolts or the like (not shown) used to hold the flanges in fluid-tight engagement with the gasket. The transfer pump includes a piston shown in dotted lines at 64 which is operated by a piston rod 65 which is, in turn, driven by a hydraulic motor (not shown) in a reciprocating path in the piston chamber to force product out of the outlet conduits 66 and 67 to a single outlet 68 which, as previously described, may be connected directly to a volumetric metering stuffer, multi-channel metering stuffer, meat form or the like.

Referring now to FIGURE 4, the cover 57 includes a vacuum gauge 70 which permits the attendant to determine at a glance whether an adequate vacuum exists within the chamber 51. The chamber 51 is continuously evacuated through an exhaust port shown at 72 in FIGURE 5. In the preferred embodiment, a vacuum sensor is connected into the electrical circuit controlling the solenoid 42 which operates the linkage to lift the valve ball 39, preventing the valve ball 39 from opening until adequate vacuum exists in the deaerating chamber 12. A probe 71 extends into the chamber 51 and when the product 52 is in contact therewith, operates to energize the solenoid 42 and move the valve ball 39 to the closed position. The level of the upper supply hopper 11 is controlled through a similar type of probe 73, shown in FIGURES 1 and 4. This probe operates to terminate operation of the conveyor 10, thus preventing overfilling of the supply hopper 21.

In operation, the deaerator of the present invention functions as follows: Meat products or the like are dumped from tote bins 20 into the lower hopper 15 at frequent intervals so that an adequate supply of product is available. A vacuum pump (not shown) establishes the proper level of vacuum in the chamber 12, at which time the solenoid 42 operating the cylinder 41 may be energized, assuming a demand for product exists, that is, the product in the chamber is not in contact with the level sensing probe 71. As the solenoid 42 is operated, fluid is admitted to the cylinder 41 opening the valve ball 39 as illustrated in FIGURE 5. In the preferred form of the invention, the solenoid is operated by a timer which is set to pulsate, that is, continue to open and close at selected intervals until the upper limit or level of product in the chamber is reached. This also serves to prevent loss of vacuum. The product, such as the meat chunks shown, under the influence of gravity and the force generated by atmospheric pressure, fall through the fixed valve seat 40 with the cylindrical guide 48, assuring a free fall into the bottom of the chamber of all the particles, and thus avoiding clinging to the interior walls, especially the underside of the lid 57. This could impair the efficiency of the deaerating operation if they were to enter the vacuum port or coat the probe 71, causing a short circuit. The size of the opening in the fixed valve seat is chosen to permit individual pieces or chunks of the product to fall through for best results in deaerating each piece and also to prevent loss of vacuum. If the opening is large enough to permit the pieces or chunks of product to enter the chamber in groups, the possibility exists that deaeration will be incomplete and entrapped air will be retained with the adverse effects noted. Obviously, the ball valve and seat may be replaced with larger or smaller sizes as requirements dictate. A more complete deaeration is assured as all parts of the product are exposed during the free fall, thus permitting air bubbles in the product to explode.

As soon as the product level reaches the lower end of the sensing probe 71, the solenoid 42 is actuated and the cylinder is operated in a reverse direction to move the valve to the closed position as shown in FIGURE 4. When the quantity of product in the upper supply hopper 11 has diminished the conveyor 18, at predetermined intervals, elevates the product from the lower supply hopper 15 into the upper supply hopper 11, with operation of the conveyor continuing until the level probe 73 is contacted in the manner shown in the fragmentary cut-away portion of FIGURE 4. At this time, the motor 19 is de-energized, terminating the elevation of the product.

Throughout the above cycles, the piston 64 in the transfer pump 13 is moving back and forth and as the de-aerated product falls through the throat 53 into the path of the piston, it is pumped out each of the outlets 66 and 67. As the supply of product is depleted in the deaeration chamber 12, the timed interval for actuation of the valve 39 is chosen so as to maintain an adequate supply to feed the pump which is operating at a constant rate.

From the foregoing, it can be appreciated that the deaerator of the present invention is extremely simple in construction and operation. Deaerators which operate on the principles embodied in the present invention can be used for other applications. Certain changes can be incorporated, for example, if the product exits the deaerating chamber at a non-uniform rate, a lower level probe may be included which would function to open the valve when the volume of product reaches a lower limit, as determined by placement of the probe. A similar lower limit probe could be incorporated in the supply hopper 11 to control the conveyor rather than a timer, if desired. However, in the present embodiment, because of the uniform rate at which the product is pumped, the frequency of valve opening and conveyor operation may be controlled by adjustable timers with upper limit levels controlled by the probes 71 and 73. The timers may be electrically related to the probes so as to only commence timing when the product is no longer in contact with the lower end of the probe. The simplified construction of the deaerator and system facilitates easy cleaning by relatively unskilled labor, thus minimizing the clean-up time. The relation of the valve and supply hopper 11 assures that adequate head or volume of material will be present to prevent a loss of vacuum upon valve opening, while permitting continuity of product feed into the deaerating chamber. In this manner, voids within the product are easily eliminated and the product may be volumetrically measured, while oxygen-free for accurate weight control when the density is uniform.

We claim:

1. A continuous deaerator for food products and the like comprising a vacuum chamber having a product inlet and a product outlet, said vacuum chamber having a connection by which it may be continuously evacuated, said product outlet being in direct communication with means to permit movement of said product out of said outlet after deaeration, said product inlet including a valve means adapted to be operated for opening and closing said product inlet to control the flow of said product into said chamber for deaeration, supply hopper means disposed around said product inlet and adapted to contain a supply of said product therein, means for maintaining the product in said hopper means to at least a sufficient level above said valve means to prevent substantial loss of vacuum during operation of said valve means to admit said product to said chamber, and said hopper level maintaining means including sensing means to control the upper level of product in said hopper means, feeding means for filling said hopper means, said sensing means operating to terminate the operation of said feeding means when said product in said hopper means reaches a predetermined level above said valve means, and control means adapted to reactivate said feeding means at a predetermined timed interval after said sensing means has operated to terminate operation of said feeding means.

2. A continuous deaerator for food products and the like comprising a vacuum chamber having a product inlet and a product outlet, said vacuum chamber having a connection by which it may be continuously evacuated, said product outlet being in direct communication with means to permit movement of said product out of said outlet after deaeration, said product inlet including a valve means adapted to be operated for opening and closing said product inlet to control the flow of said product into said chamber for deaeration, supply hopper means disposed around said product inlet and adapted to contain a supply of said product therein, and means for maintaining the product in said hopper means to at least a sufficient level above said valve means to prevent substantial loss of vacuum during operation of said valve means to admit said product to said chamber, said valve means comprising a fixed valve seat and a movable valve member, said fixed valve seat being positioned on an opening formed at the top of said vacuum chamber, and slot means being formed in the margins of said opening to permit removal of said fixed valve seat from the underside of said opening.

3. The continuous deaerator as defined in claim 2 wherein said fixed valve seat includes a cylindrical sleeve projecting into said vacuum chamber to direct said product to the bottom of said chamber and to prevent clinging of said product to the underside of said chamber around said opening.

4. A continuous deaerator for food products and the like comprising a vacuum chamber having a product inlet and a product outlet, said vacuum chamber having a connection by which it may be continuously evacuated, said product outlet being in direct communication with means to permit movement of said product out of said outlet after deaeration, said product inlet including a valve means adapted to be operated for opening and closing said product inlet to control the flow of said product into said chamber for deaeration, supply hopper means disposed around said product inlet and adapted to contain a supply of said product therein and means for maintaining the product in said hopper means to at least a sufficient level above said valve means to prevent substantial loss of vacuum during operation of said valve means to admit said product to said chamber, said valve means including valve pulsating means which intermittently opens and closes said valve means for a series of relatively short timed intervals after the valve means has been operated to admit said product from said hopper means into said chamber, said intermittent opening and closing of said valve means serving to help maintain an adequate vacuum in said vacuum chamber and thereby provide for admission of said product into said chamber without appreciable loss of vacuum.

5. The continuous deaerator as defined in claim 4 wherein product level sensing means are provided in said vacuum chamber to automatically inactivate and close said valve means when said product in said chamber rises to a predetermined level.

6. The continuous deaerator as set forth in claim 5 wherein said valve means includes control means adapted to reactivate said valve means at a predetermined timed interval after said valve means has been closed by said product level sensing means.

7. A continuous deaerator for food products and the like comprising a vacuum chamber having a product inlet and a product outlet said vacuum chamber having a connection by which it may be continuously evacuated, said product outlet being in direct communication with means to permit movement of said product out of said outlet after deaeration, said product inlet including a valve means adapted to be opened and closed to control the flow of said product into said chamber for deaeration, supply hopper means disposed around said product inlet and adapted to contain a supply of said product therein, said supply hopper being in direct communication with said vacuum chamber and vacuum being applied to said product in said hopper when said valve means is open, and means for preventing substantial loss of vacuum when said valve means is open to admit said product to said chamber including means for maintaining the product in said hopper means at a sufficient level above said valve means.

8. The continuous deaerator as defined in claim 7 wherein said hopper means includes a sleeve like section closely surrounding said valve means to provide a section of reduced cross-sectional area relative to the upper part of said hopper means, said section of reduced cross-sectional area, in the area adjacent said valve means, serving to minimize the cross-sectional area of the product which is directly exposed to the vacuum in said vacuum chamber when said valve means is open, to thereby prevent substantial loss of vacuum from said chamber when said valve means is open.

9. In a deaerating chamber including a vacuum chamber having an outlet communicating with means to convey the deaerated product from said chamber and an inlet for admitting the product to be deaerated to said chamber, the improvement comprising means to control entry of product to be deaerated into said chamber without an appreciable loss of vacuum therefrom, said means including a valve means adapted to be opened and closed, sleeve means surrounding said valve means to reduce the cross-sectional area of said hopper in the area adjacent said valve means, said sleeve means being in direct communication with said vacuum chamber and vacuum being applied to said product in said sleeve means when said valve means is open, and means for keeping said product at a predetermined level in said sleeve means whereby said valve means can be opened to admit product to said chamber without an appreciable loss in vacuum.

10. A continuous deaerator for food products and the like comprising a vacuum chamber having a product inlet, a product outlet, and a connection by which said vacuum chamber may be continuously evacuated, said product outlet being in direct communication with means for removing the deaerated product from said chamber, a product supply hopper having a discharge opening, tubular means interconnecting said hopper discharge opening and said chamber product inlet, and valve means for controlling the times and rates of flow of product from said hopper into said chamber and positioned to back up the product in said tubular means upstream of said product inlet and thereby prevent loss of vacuum from said chamber when said valve means is open, said tubular means being in direct communication with said vacuum chamber and vacuum being applied directly to said product in said tubular means when said valve means is open.

11. The deaerator of claim 10 wherein said vacuum chamber is provided with a product sensing probe which generates a signal when the product level in said chamber rises to touch the probe, and means operatively interconnecting said probe with said valve to close the same.

References Cited

UNITED STATES PATENTS

| | | |
|---|---|---|
| 2,183,837 | 12/1939 | Hamilton et al. |
| 2,517,569 | 8/1950 | Huzenlaub _____ 99—239 XR |
| 2,539,226 | 1/1951 | Bierman _____ 99—240 |
| 2,732,009 | 1/1956 | Thürlings. |
| 2,751,687 | 6/1956 | Colton. |
| 2,842,177 | 7/1958 | Schnell. |
| 3,081,484 | 3/1963 | Schnell _____ 17—35 |
| 3,108,319 | 10/1963 | Thompson _____ 17—39 |
| 3,147,784 | 9/1964 | Sloan _____ 17—35 XR |
| 3,256,800 | 6/1966 | Halldorsson _____ 99—246 |
| 3,314,219 | 4/1967 | Griffin et al. ____ 55—189 XR |
| 3,399,999 | 9/1968 | Ellett _____ 99—239 XR |

ROBERT W. JENKINS, Primary Examiner

U.S. Cl. X.R.

251—360